UNITED STATES PATENT OFFICE.

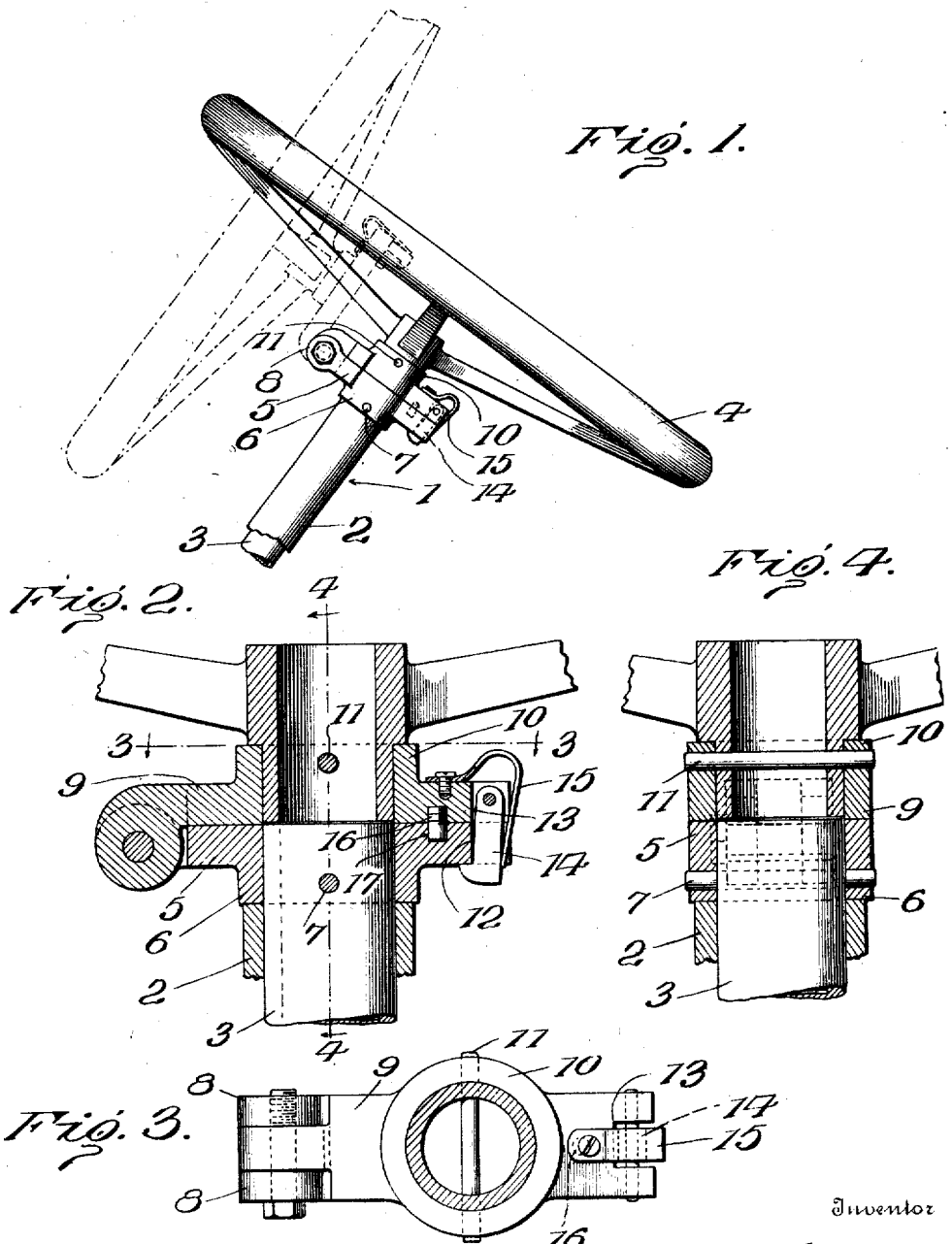

JOHN F. MEANS, OF OIL CITY, PENNSYLVANIA.

STEERING-WHEEL OF MOTOR-VEHICLES.

1,171,224.  Specification of Letters Patent.  Patented Feb. 8, 1916.

Application filed April 13, 1914. Serial No. 831,537.

*To all whom it may concern:*

Be it known that I, JOHN F. MEANS, a citizen of the United States, residing at Oil City, in the county of Venango and State of Pennsylvania, have invented certain new and useful Improvements in Steering-Wheels of Motor-Vehicles; and I do declare the following to be a full, clear, and exact description of the invention, such as will enable others skilled in the art to which it appertains to make and use the same.

This invention relates to new and useful improvements in steering apparatus and more particularly to an attachment for the steering wheel which will enable the latter to be disposed at an angle whereby a greater clearance may be had between the steering post and the driver's seat.

A still further object of the invention resides in providing an improved hinged construction between the steering wheel and the steering post to enable the former to be disposed at another angle with respect to the latter than that provided therefor in the usual position of the wheel with respect to the post.

Still another object of the invention resides in providing a construction which is simple and durable, inexpensive to manufacture and one which will be very efficient and useful in operation.

With these and other objects in view my invention consists in the novel features of construction, combination and arrangement of parts as will be hereinafter referred to and more particularly pointed out in the specification and claim.

In the accompanying drawing forming a part of this application:—Figure 1 is a side elevation of a device constructed in accordance with my invention and applied to use. Fig. 2 is an enlarged vertical section therethrough. Fig. 3 is a horizontal section therethrough as seen on line 3—3, Fig. 2, and, Fig. 4 is a vertical section as seen on line 4—4, Fig. 2.

In describing the invention I shall refer to the drawing in which similar reference characters designate corresponding parts throughout the several views and in which—

1 indicates a steering post of the usual construction provided for a motor driven vehicle the same comprising an outer shell or casing 2 which is stationary and an inner movable or rotatable post or member 3. A wheel 4 is provided, the same being of the usual design provided for steering apparatus of this character and my invention primarily contemplates the provision of a means for connection between the wheel and the rotatable shaft 3 which will enable the wheel to be disposed at another angle with respect to said post than that usually provided therefor.

In carrying out my invention, I provide a plate member 5 which has a central opening therein and the under face of which is provided with a collar 6 surrounding said opening. This collar is secured to the upper end of the rotatable shaft 3 which projects slightly above the upper end of the shell or casing 2, such connection between the collar 6 and the shaft 3 being had by means of a transversely extending pin or the like 7. One end of said plate-like member 5 is provided with a pair of spaced apart knuckles 8 between which pair is hingedly disposed an additional knuckle formed on one end of an additional plate-like member 9, a pintle or pin being disposed through the knuckles of said members 8 and 9 whereby to provide a hinged connection therebetween. The upper face of the plate member 9 is provided with a collar 10 which is arranged about centrally thereon and this collar receives therein a depending collar formed centrally of the wheel 4. A pin or the like 11 is disposed transversely through the collar 10 for engagement with the depending collar on the wheel 4 thus securely retaining the latter in position on the upper hinge plate 9. In the normal position of the device, the plates 5 and 9 are disposed one upon the other so that the wheel 4 is in a plane at right angles to the plane of the shaft or steering post 1 but when the plate 9 is moved with respect to the plate 5 through the hinged connection, said wheel will be disposed substantially longitudinally of said steering post.

The ends of the plates 5 and 9 opposite that at which the same are hinged one to the other are provided with offsets or channels 12 and 13 respectively, the same alining with one another and pivotally held in the channel 13 of the member 9 is a locking dog 14, the same being adapted to swing in the channel 12 of the plate 5 when the plate 9 is disposed on the latter so that the engaging edge of said dog will contact with the under face of said plate member 5. This locking dog 14 is normally held in effective engaging position by means of a leaf spring 15 which is secured at its one end to the top face of said plate 9 and which is bent intermediate of its ends, the extreme free end being disposed in contact with the outer edge of said locking dog 14. It will thus be seen that when the plate 9 is disposed flatly against the plate 5 the dog 14 will be automatically engaged with the under face of said plate 5, thus locking said plates 5 and 9 to one another and securing the steering wheel 4 in its proper position for the operation of the steering rod 3. When so disposed, the steering wheel 4 may be rotated in either direction and the desired result will be effected. In order to prevent any strain upon the hinged connection between the plates 5 and 9 in the operation of the device, a stud 16 is provided on the plate member 9 which depends therefrom and is received in a socket or recess 17 in the upper face of the plate member 5. This stud and socket are positioned adjacent the outer ends of the respective members and obviously provide a secure engagement between the plates, thus removing any undue strain from the hinged connection between said plates as the wheel is turned in either one direction or the other. When it is desired to dispose the wheel to its inoperative position so as to provide a greater clearance between the steering post and the driver's seat, it is only necessary to grasp the engaging end of the locking dog 14 and draw outwardly thereon against the tension of the spring 15. This disengages said locking dog and by a movement upwardly will dispose the plate 9 with the wheel 4 thereon to its inoperative position as shown in Fig. 1. As stated above the device will be automatically locked in its effective position upon the returning of the wheel to its normal position.

From the foregoing, it will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to, within the scope of the appended claim, without departing from the spirit or sacrificing any of the principles of the invention.

Having thus described my invention, what I claim is:

In a steering device, the combination with a steering post composed of a hollow shaft, of a rotatable shaft therein and projecting therefrom at its upper end, a plate member having therein a central opening surrounded by a depending collar and a pair of spaced apart knuckles formed on one end, said collar receiving the upper end of the rotatable shaft, a pin extending transversely through said collar and said shaft, whereby the plate member is reliably secured in position, an additional plate member having therein a central opening of the same size as and adapted to aline with the opening in said first mentioned plate, said plate being provided with a collar on its upper face surrounding said openings and a knuckle formed on one end adapted to be disposed between said pair of knuckles to provide a hinged connection between said plates, one of said plate members having a socket therein and the other having a stud positioned to enter said socket, said socket and stud being disposed diametrically opposite the hinged connection of the plate, a wheel provided with a collar on its under face of the same diameter as the projecting end of said rotatable shaft, said collar being adapted to be received in the last mentioned collar, a pin extending transversely through said collars, whereby the additional plate member is reliably secured in position, said plates having registering notches therein at points opposite the hinged connection thereof, a locking dog pivotally mounted in the notch of the upper plate with its locking end extending through the notch in the other plate in position to engage the lower face of said last mentioned plate, and a resilient member positioned to normally force said dog in a locking position.

In testimony whereof I have hereunto set my hand in presence of two subscribing witnesses.

JOHN F. MEANS.

Witnesses:
JOHN D. MOHR,
FRANK X. GUTH.

Copies of this patent may be obtained for five cents each, by addressing the " Commissioner of Patents, Washington, D. C."